United States Patent [19]
Fisher et al.

[11] Patent Number: 5,883,140
[45] Date of Patent: Mar. 16, 1999

[54] PROCESS FOR REGENERATION OF RUBBER

[75] Inventors: James F. Fisher; James R. Jury, both of Brampton; Michael D. Burgoyne, Mississauga, all of Canada

[73] Assignee: National Rubber L.L.C., Detroit, Mich.

[21] Appl. No.: 588,494

[22] Filed: Jan. 18, 1996

Related U.S. Application Data

[63] Continuation-in-part of Ser. No. 161,341, Dec. 6, 1993, abandoned.

[51] Int. Cl.$^6$ ............................ B29B 13/10; B29B 7/40
[52] U.S. Cl. ............................ 521/45.5; 521/41; 521/47
[58] Field of Search ........................... 521/45.5, 41, 47

[56] References Cited

U.S. PATENT DOCUMENTS

| | | |
|---|---|---|
| 2,221,490 | 11/1940 | Robinson . |
| 2,408,296 | 9/1946 | Harriss et al. . |
| 2,414,145 | 1/1947 | Evans . |
| 2,461,192 | 2/1949 | Banbury et al. . |
| 2,461,193 | 2/1949 | Banbury et al. . |
| 2,487,666 | 11/1949 | Navone . |
| 2,494,593 | 1/1950 | Sverdrup . |
| 2,966,468 | 12/1960 | Dasher ................................. 260/2.3 |
| 3,460,769 | 8/1969 | Merges . |
| 4,101,463 | 7/1978 | Morgan et al. . |
| 4,137,204 | 1/1979 | McDonald . |
| 4,146,508 | 3/1979 | Maxwell . |
| 4,400,488 | 8/1983 | Huff . |
| 4,851,500 | 7/1989 | Lalwani et al. . |
| 5,023,027 | 6/1991 | Nopper . |
| 5,304,576 | 4/1994 | Martinez . |

FOREIGN PATENT DOCUMENTS

| | | |
|---|---|---|
| 457307 | 6/1949 | Canada . |
| 479941 | 1/1952 | Canada . |
| 514450 | 7/1955 | Canada . |
| 541309 | 5/1957 | Canada . |
| 737540 | 6/1966 | Canada . |
| 924849 | 5/1973 | Canada . |
| 941553 | 2/1974 | Canada . |
| 1028796 | 3/1978 | Canada . |
| 1029889 | 4/1978 | Canada . |
| 1052063 | 4/1979 | Canada . |
| 1069079 | 1/1980 | Canada . |
| 1152249 | 8/1983 | Canada . |
| 1187669 | 5/1985 | Canada . |
| 2053789 | 10/1991 | Canada . |
| 074344 | 9/1981 | European Pat. Off. . |
| 571784 | 9/1945 | United Kingdom . |
| 610812 | 10/1948 | United Kingdom . |
| 1568357 | 5/1980 | United Kingdom . |
| 2076404 | 12/1981 | United Kingdom . |
| WO 86/05192 | 9/1986 | WIPO . |
| WO 91/14552 | 10/1991 | WIPO . |

OTHER PUBLICATIONS

Modern Plastics Encyclopedia, pp. 345, 348, Oct. 1989.
Abstracts: SU 433163, 1974.
SU 424865–A, 1974.
GB 1568357–A, 1980.
J 55–098235–A, 1980.
SU 1183381–A, 1985.
Abstracts: DD 216474–A, 1985.
FR 2462459–A, 1981.
SU 747560–B, 1980.
J 77028830–B, 1977.
SU 1458364–A, 1989.
WO 9201745–A, 1992.
J 54006083–A, 1979.
J 60067117–A, 1985.
SU 433165–A, 1976.
J 52077185–A, 1977.
Derwent AN 84–282735 C 46! Abstract of East German Patent Publication DD–A–211575.
Derwent AN 93–043483 CO5! Abstract of Soviet Union Patent Publication SU–A–717 381.

*Primary Examiner*—Fred Zitomer
*Attorney, Agent, or Firm*—Ridout & Maybee

[57] ABSTRACT

Reclaim rubber is obtained from vulcanized rubber by subjecting a mass of the rubber to mechanical working applying highly intensive impact forces to the mass. The process is relatively energy efficient and therefore produces reclaim rubber at relatively low cost. It also mitigates the objectionable smell associated with known reclaim rubber products. The process can be used with the addition of small amounts (usually of the order of 1% to 2% by weight) of various chemicals known to retard cure rates in rubber, but it has been shown to be efficient on a production basis to operate without the addition of, or dependence on, any added chemicals.

29 Claims, No Drawings

PROCESS FOR REGENERATION OF RUBBER

This application is a continuation-in-part of patent application Ser. No. 08/161,341 filed Dec. 6, 1993, abandoned.

There have been prior attempts at treating cured (vulcanized) rubber scrap material to break it down in some manner to effectively regenerate it, and thereby provide a rubber material which can be recompounded, and subsequently molded and cured. The result of this process is a material usually known as reclaim rubber.

Known processes generally comprise the following:
a) swelling the rubber with oils and then treating with chemicals such as caustic soda, and steam distilling the mixture;
b) attacking the rubber as above, and then treating in a autoclave;
c) applying specific wavelengths of micro-wave or radio-frequency radiation for lengthy periods of time; and
d) exposing the rubber to work energy in the presence of large amounts of various chemicals.

These processes are not as energy-efficient as is desirable and costs of producing reclaim rubber by these processes are high. Moreover, with the known processes the reclaim rubber has an objectionable smell associated with it, and often produce undesirable by-products such as hazardous waste materials.

Various procedures and forms of apparatus are known for applying mechanical forces to rubber and like materials for the purposes of mixing, compounding and blending rubbers, elastomers and plastics. Such mixing, compounding and blending equipment usually is capable of inducing high intensity shearing forces in a plastic mass. Examples of such equipment include BANBURY® mixers available from Farrell Corporation, Ansonia, Connecticut, FARRELL® continuous mixers, also available from Farrell Corporation, and twin screw extruders from a number of manufacturers.

Attempts have been made to regenerate rubber by applying mechanical forces using such equipment but all prior attempts of which applicants are aware required excessively long processing times and expenditure of excessive amounts of energy and resulted in production of material that is not satisfactorily regenerated.

Applicants have now found a process whereby regenerated or reclaim rubber can be produced relatively inexpensively, that mitigates the objectionable smell characteristic of known reclaim rubbers, and avoids the production of undesirable by-products.

Applicants have found that when a mass consisting substantially wholly of finely divided vulcanized rubber is subjected to high intensity impact forces, the rubber becomes rapidly substantially regenerated to the point that it can be effectively re-vulcanized. This process can be conducted in short times, is highly efficient, and produces reclaim rubber at considerably less cost than the known processes. Moreover, the product is free from or has the above-mentioned objectionable smell associated with it to a lesser extent, and produces no by-products presenting environmental concerns.

Applicants have found that the process of the invention may preferably be carried out using a specialty type of mixer/compounder not commonly used in the rubber industry, but familiar to those experienced in the art of mixing and compounding plastic materials. That equipment has novel application in the present invention. Applicants have found that exposing cured scrap rubber or the like to the extremely intense action of a GELIMAT (trademark) blender (available from Draiswerke Inc., Mahwah, N.J.), or essentially similar equipment available from other sources, results in the re-generation of the rubber compound. Such equipment may be operated in either a batch or continuous fashion.

Whereas the equipment cited above as being familiar to those practiced in the art of mixing, compounding and blending of rubber is generally considered to impart shearing forces to the mass, the equipment used in the present invention is unique in that shearing is not involved as the primary functional force. Rather, it is considered that the energy necessary to re-generate the rubber is imparted to the rubber by an impact mechanism, although a minor amount of incidental shearing may be a by product of the process as the rubber heats up and becomes more mobile.

The manner or mechanism by which the high intensity impact action serves to effect regeneration is not presently fully understood but, without wishing to be bound by any theory, is considered to result from breakage of sulfur-sulfur or other crosslinking bonds and possibly breakage of carbon-carbon bonds.

In case of uncertainty it is in any event possible to determine by simple trial and experiment whether a given type of equipment provides sufficiently intensive impact forces to effect regeneration, by placing a small quantity of finely divided vulcanized rubber in the equipment and subjecting it to the mechanical action of the equipment at progressively increasing levels of power consumption until an indication of regeneration is obtained. It has been found that a useful indication of the onset of regeneration is given by the mass becoming tacky, and demonstrates 'green' or un-cured rubber characteristics such as the ability to be blended on a mill into an integral sheet, and the ability to be re-vulcanized to a high percentage of the original physical properties, and this therefore provides a readily determined indicator of regeneration.

In the present invention, the mass is subjected to mechanical working applying sufficiently intensive impact forces for a period such that the mass is substantially regenerated. The degree of regeneration is best determined by comparing the strength properties, such as tensile strengths, achieved on curing of the regenerated mass, with those achieved on curing, under similar conditions, of a chemically similar virgin (never vulcanized) rubber. For example, in the case of passenger car tire crumb, consisting of vulcanized styrene-butadiene rubber, or a blend of styrene-butadiene and natural rubbers, the degree of regeneration may be determined by comparing its tensile strength after curing under standard conditions with those obtained after curing of a similar virgin styrene-butadiene rubber or styrene-butadiene natural rubber blend under the same conditions. Preferably, the degree of regeneration as indicated by such cured tensile strengths, as a percentage based on the cured tensile strengths achieved with the similarly cured virgin rubbers, is at least about 35%, more preferably 40%, and still more preferably 45%.

Moreover, the degree of regeneration can be demonstrated by the reduction in the viscosity of the material, as compared with a dry powder blend of tire crumb and sulfur and other curative chemicals, with respect to the cure curve obtained when tested on equipment such as a Monsanto Oscillating Disc Rheometer.

In the process of the present invention, the tire crumb or other finely divided vulcanized rubber is preferably present as substantially the sole component of the mass undergoing regeneration. Preferably at least about 90%, more preferably at least about 95%, and still more preferably up to 100%, by weight of the mass consists of vulcanized rubber.

If desired the vulcanized rubber particles may be mixed with small quantities of various additives before subjecting them to the present process. Examples of such additives include hydrocarbon-based oils and conventional vulcanization inhibitor compounds such as phthalic anhydride, potassium phthalimide, phthalimide and tributylphosphite, which may be added in amounts of preferably no more than about 5%, based on the total weight of the mixture.

Preferably, the equipment used is such that it dissipates energy within the mass at a relatively high rate, so that regeneration is achieved in a short period, preferably of the order of a few seconds, for example about 2 to about 20 seconds. Preferably the rate of power dissipation is not less than about 1,000 watts per 100 g of the mass undergoing the high intensity impact action, otherwise the time taken to achieve regeneration may tend to be unacceptably long and hence the throughputs unacceptably low and costly. Preferably, the rate is not greater than about 145,000 watts per 100 g otherwise degradation of the rubber may tend to occur within such a short time span that the reaction may tend to be difficult to control. In the course of mechanically working the vulcanized rubber mass, it is important to avoid excessive working such that the rubber is degraded. Such degradation is indicated by the mass acquiring a crispy texture and a burnt smell and exhibiting little or no tensile strength on curing or being so friable or brittle in texture that it is difficult or impossible to mix it adequately with curing agents for the purpose of conducting tests of vulcanizability. Accordingly in the present invention the mass is subjected to highly intensive impact forces sufficient to regenerate the mass without substantially degrading it, to the point that it can be revulcanized as stated above. More preferably the rate of energy dissipation in the mass is about 4,000 to about 35,000 watts per 100 g of the mass, still more preferably about 9,000 to about 17,000 watts per 100 g.

In the case of many electrically-driven forms of equipment, the equipment as supplied by the manufacturer may be provided with an integrating ammeter providing an indication from which the rate of power dissipation can be determined or calculated. The power dissipation rate of other forms of equipment can be readily determined by conventional procedures well known to those of skill in the art.

Preferably, the equipment employed comprises a rotary mixer having a stationary chamber that holds the mass undergoing regeneration and at least one mixer member rotating in the chamber. In the case in which the mixing element or elements extend generally radially within the chamber, the mechanical action can be described in terms of the mechanical impact velocity which is defined as the velocity of the highest velocity portion of the rotary mixer member with respect to the chamber. Preferably the mixer provides a mechanical impact velocity of about 20 to 70 meters per second, more preferably about 25 to 50 meters per second.

The preferred GELIMAT (trademark) apparatus comprises, for example, a cylindrical chamber, and a shaft extending co-axially within the chamber. The shaft is provided with a plurality of radially extending mixing elements, which as viewed laterally of the axis, increase in width towards their tips adjacent the inner wall of the chamber, the tips presenting paddle-like surfaces that extend in planes generally parallel to the axis or slightly angled thereto, and that face generally laterally of the axis, so that as the mixing elements rotate with the shaft the generally flat paddle-like surfaces impact on the material within the chamber. Particles within the chamber are thereby subjected to impact against the chamber wall, the mixing elements and themselves. For further particulars, reference may be made for example to literature describing the GELIMAT (trademark) apparatus, for example Draiswerke "New Developments in Superfast Compounding", Drais News, Vol. 1 No. 4, 8 pgs. Other apparatus that subjects finely divided material to high intensity impact forces may of course be employed.

By virtue of the highly intensive mechanical impact to which the mass is subjected and of rubber's properties of kinematic restitution it will usually exhibit a fairly rapid rise in temperature during the course of the process, for example as a result of hysteresis or internal friction losses arising from the rapid deformation and elastic restoration of shape of the particles following the impacts discussed above. Preferably, the working is such that the mass exhibits a rate of temperature rise of about 5° C./sec to about 60° C./sec, more preferably about 10° C./sec to about 50° C./sec.

Typically, when the mass is subjected to mechanical working sufficient to achieve substantial regeneration, its temperature will rise to at least about 190° C. Working that is insufficient to raise the mass to at least this temperature is usually insufficient to achieve substantial regeneration. Preferably the temperature of the mass does not rise above about 320° C. more preferably not above about 300° C. during the process, since exposure of the mass to such temperatures for more than a brief period may tend to result in degradation of the rubber.

As noted above, as regeneration commences, the mass tends to become tacky. The power consumed by the equipment, at least when operated at approximately constant speed, tends to increase as the regeneration proceeds and the mass becomes progressively more tacky. Further, as noted above, the temperature of the mass tends to increase during the course of the process. Applicants have found that, other conditions being equal, it is possible to monitor the degree of regeneration of the mass by observing the power consumption or rate of energy dissipation, or the maximum residence time within the mixing chamber, or both, and use the observed or measured values to control the process. For example, such values may be used to determine the point at which the mass is exited from the equipment in the case of batch operation, or to control the rate of throughput of the material in the case of continuous operation.

The process of the invention may be used to treat a wide variety of vulcanized rubber materials. Preferably, because of its wide availability and relatively low cost, the vulcanized rubber starting material is tire crumb obtained in the conventional manner by grinding road vehicle tires, for example passenger car tires or heavy service tires, for example truck, bus, aircraft, etc. tires. Preferably, the tire crumb is substantially free from tire cord and metal. Other sources of scrap or discarded vulcanized rubber may of course be employed.

In order to effectively regenerate the rubber within an acceptably short period, desirably the starting material rubber is in the form of finely divided particles. Preferably the particle size of the rubber is not greater than about 4 mesh (all mesh sizes herein refer to Tyler standard sieve). Preferably, the particle size is not less than about 200 mesh, since smaller particle sizes do not appear to result in significantly increased rates or degrees of regeneration, and tend to greatly increase the energy costs. More preferably the particle size is about 6 to about 100 mesh.

The invention will now be described in more detail by way of example only with reference to the following Examples and Comparative Example.

EXAMPLES 1 TO 24 AND COMPARATIVE EXAMPLE

Tire crumb was regenerated using a GELIMAT G1 mixer/compounder obtained from Draiswerke, Inc., Mahwah, N.J.

This machine has a horizontally extending cylindrical chamber with a central shaft provided with staggered generally radially extending mixing elements. The shaft is rotated, at controllable rpm, by a 600 v motor. Material to be treated, in the present Example finely divided vulcanized rubber usually in the form of 100 g batches, is introduced into the chamber through a top hopper with a locking slide. The chamber is equipped with an ammeter shaft drive measuring energy input or power dissipation. The outputs of these are fed to a microprocessor which controls a discharge door provided on the chamber. The device is settable so that when a given time or power dissipation peak or level is attained, the door is opened so that the mass is discharged rapidly from the chamber under the action of centrifugal force.

A number of runs were conducted at various rpms, and with discharge set to take place at various times or amperage peaks as indicated by the above mentioned equipment. In each case the actual temperature of the mass exiting the chamber was measured using a digital temperature probe and this temperature is referred to as the "eject temperature" in Table 1. Actual measurements of the temperature of the material in the chamber can be difficult and inaccurate due to the nature of the material, which is often black. By measuring the temperature of the ejected material at a range of power consumption levels an effective calibration can be obtained.

Thereafter, uniform ejection temperatures can be achieved by monitoring the unit power consumption.

The eject temperatures obtained over a large number of runs are given in Table 1; together with calculated maximum rotor element velocity (tip speed) and power dissipation rates.

TABLE 1

| rpm | Tip Speed (m/s) | Eject temp °C. | Ampere Reading | Power dissipation watts/100 g |
|---|---|---|---|---|
| 3000 | 25.7 | 175 | — | — |
|  |  | 195 | — | — |
|  |  | 210 | 15.5 | 9,300 |
|  |  | 220 | 17 | 10,200 |
|  |  | 230 | 18.5 | 11,100 |
|  |  | 250 | 19.5 | 11,700 |
| 3500 | 30 | 210 | 18 | 10,800 |
|  |  | 220 | 19 | 11,400 |
|  |  | 230 | 20.5 | 12,300 |
|  |  | 250 | 22 | 13,200 |
| 4000 | 34.3 | 210 | 23 | 13,800 |
|  |  | 230 | 25 | 15,000 |
|  |  | 240 | 26 | 15,600 |
|  |  | 250 | 27 | 16,200 |

A number of runs were made at various rpms and eject temperatures. The vulcanized rubber batch charged to the machine for the reported experiments was, unless otherwise indicated, 8 mesh passenger car tire crumb (free from steel and tire cord), either alone or in admixture with an additive. The percentages indicate the content of additive based on the total weight of the mixture. In each case the mixture was exited into a metal bucket and stirred to cool it quickly to reduce risk of degradation or combustion. Usually the interval between a batch entering and the reclaim product exiting the machine was about 8 to about 16 sec.

The degree of regeneration was determined by mixing the reclaim product in the following formulation:

47.6 g reclaim product 0.71 g sulfur 1.19 g zinc oxide 0.48 g stearic acid 0.36 g Delac accelerator.

This mixture was blended in a Haake Bukler Rheocord 600 mixer for 7 min. at 80 rpm at 80° C.

The blended samples were placed in a heated mould (2 mm thick copper frame between two copper sheets) that had been sprayed with silicone spray (LPS heavy duty silicone lubricant). The mould was placed into a press and gently pressed for 30 sec to allow some heating of the rubber. The pressure was increased to 1400 psi, held for 30 sec, released to allow any air pockets to dissipate, pressed at 960 psi for 30 sec, again released to allow air to escape, and then pressed for 6 minutes at the process temperature of 180° C. (350° F.) and at a pressure of 960 psi. The plates were removed and allowed to cool.

After allowing the plates and the process to cool, ASTM standard dumbbell samples were cut using a standard die. Cutting was done on a polyethylene cutting board and using the press to provide an even pressure on the die.

Tensile strengths and elongations at break of the samples were determined on an Instron Tensile Testing machine, calibrated using a 10 lbs weight and set to stretch the sample at 20 inch/min. The samples were loaded at an initial jaw spacing of 43.2 mm.

The results indicated in Table 2 are mean values obtained in each case from a series of five tests.

It was found that when the eject temperature was less than about 190° C., the mass did not become tacky and remained friable and insufficiently cohesive to be blended to form a coherent mixture and therefore cured tensile strength testing was not possible. When the eject temperature was above about 250° C., there was risk that the crumb became degraded and excessively tacky and would stick inside the primary processing chamber. In such case, the small portion ejected smoked profusely and quickly turned crispy. When cool, the sample smelled burnt and had no tackiness. The crispy degraded samples were not suitable for blending and could not be tested for cured tensile strengths.

TABLE 2

| Example No. | Note | Rpm | Eject temp °C. | Tensile psi | Elongation % |
|---|---|---|---|---|---|
| 1. | — | 3000 | 250 | 465 | 121 |
| 2. | — | 3000 | 250 | 394 | 111 |
| 3. | (a) | 3000 | 250 | 454 | 151 |
| 4. | — | 3500 | 250 | 420 | 113 |
| 5. | (b) | 3500 | 250 | 471 | 128 |
| 6. | (c) | 3500 | 250 | 412 | 108 |
| 7. | — | 4000 | 210 | 462 | 125 |
| 8. | (d) | 4000 | 210 | 515 | 153 |
| 9. | (e) | 4000 | 210 | 502 | 144 |
| 10. | (f) | 4000 | 210 | 445 | 113 |
| 11. | (g) | 4000 | 210 | 472 | 133 |
| 12. | (h) | 4000 | 210 | 469 | 124 |
| 13. | (j) | 4000 | 210 | 275 | 71 |
| 14. | (k) | 4000 | 210 | 411 | 115 |
| 15. | — | 4000 | 230 | 317 | 116 |
| 16. | — | 4000 | 250 | 408 | 116 |
| 17. | (l) | 4000 | 250 | 517 | 139 |
| 18. | (m) | 4000 | 250 | 525 | 145 |
| 19. | (u) | 4000 | 250 | 456 | 141 |
| 20. | (o) | 4000 | 250 | 487 | 144 |
| 21. | (p) | 4000 | 250 | 457 | 168 |
| 22. | (q) | 4000 | 250 | 392 | 134 |
| 23. | (r) | 4000 | 250 | 458 | 137 |

TABLE 2-continued

| Example No. | Note | Rpm | Eject temp °C. | Tensile psi | Elongation % |
|---|---|---|---|---|---|
| 24. | (s) | 4000 | 250 | 705 | 214 |
| Comparative Example | (t) | — | — | 990 | 207 |

Notes
(a) Santogard PVI (prevulcanization inhibitor), 1% (all percentages based on the total weight of the mixture), dissolved in 3% hot aromatic oil was added to the tire crumb before treatment.
(b) 110 g of the tire crumb was added to the GELIMAT machine instead of 100 g.
(c) 90 g of the tire crumb was added to the GELIMAT machine instead of 100 g.
(d) The tire crumb was 30 mesh instead of 8 mesh.
(e) 1% Santogard PVI was added to the tire crumb before treatment.
(f) 1% phathalic anhydride was added.
(g) 1% potassium phthalimide added.
(h) 1% phthalimide added.
(j) 2% phthalimide and 2% oil added.
(k) 2% oil added.
(l) Results obtained with a portion of the regenerated rubber product which was stored for one week before curing.
(m) Results obtained with a portion of the same product as Example 17, cured the same day.
(u) 1% Santogard PVI added.
(o) 2% Santogard PVI added.
(p) 1% tributylphosphite and 3% oil added.
(q) 1% Santogard PVI and 3% oil added.
(n) 1% potassium phthalimide added.
(s) 10 mesh truck tire crumb (having a content of vulcanized natural rubber) was substituted for the passenger car tire crumb.
(t) 47.6 g of virgin SBR rubber was substituted in the formulation given above, and was blended, cured and tested as described above.

Notes (a) Stantogard PVI (prevulcanization inhibitor), 1% (all percentages based on the total weight of the mixture), dissolved in 3% hot aromatic oil was added to the tire crumb before treatment.
(b) 110 g of the tire crumb was added to the GELIMAT machine instead of 100 g.
(c) 90 g of the tire crumb was added to the GELIMAT machine instead of 100 g.
(d) The tire crumb was 30 mesh instead of 8 mesh.
(e) 1% Santogard PVI was added to the tire crumb before treatment.
(f) 1% phathalic anhydride was added.
(g) 1% potassium phthalimide added.
(h) 1% phthalimide added.
(j) 2% phthalimide and 2% oil added.
(k) 2% oil added.
(l) Results obtained with a portion of the regenerated rubber product which was stored for one week before curing.
(m) Results obtained with a portion of the same product as Example 17, cured the same day.
(u) 1% Santogard PVI added.
(o) 2% Santogard PVI added.
(p) 1% tributylphosphite and 3% oil added.
(q) 1% Santogard PVI and 3% oil added.
(n) 1% potassium phthalimide added.
(s) 10 mesh truck tire crumb (having a content of vulcanized natural rubber) was substituted for the passenger car tire crumb.
(t) 47.6 g of virgin SBR rubber was substituted in the formulation given above, and was blended, cured and tested as described above.

We claim:

1. A process for regeneration of rubber to form a vulcanizable rubber mass, said process consisting essentially of the steps of:

providing a mass consisting essentially of vulcanized rubber in finely divided form in an apparatus for applying mechanical forces to rubber comprising a stationary chamber and a single rotor shaft carrying a rotor element having a tip, said element being rotatable in the chamber at a tip speed of at least about 20 meters per second;

subjecting said mass to mechanical working that applies impact forces to said mass by rotating said element at a tip speed of at least about 20 meters per second, said mechanical working being sufficient to regenerate said rubber without degrading said rubber, such that a vulcanizable rubber mass is formed exhibiting on curing a tensile strength of at least 35% that of similarly cured virgin rubber compound.

2. A process according to claim 1 wherein said impact forces dissipate energy in said mass at a rate of from about 1,000 to 145,000 watts per 100 g of the weight of said mass.

3. A process according to claim 2 wherein said rate is about 4,000 to about 35,000 watts per 100 g.

4. A process according to claim 1 wherein said rubber is tire crumb.

5. A process according to claim 4 wherein said tire crumb is passenger tire crumb.

6. A process according to claim 4 wherein said tire crumb is derived from heavy service tires.

7. A process according to claim 1 wherein said rubber has a particle size about 4 to about 200 mesh.

8. A process according to claim 7 wherein said particle size is about 6 to about 100 mesh.

9. A process according to claim 1 wherein said impact forces raise the temperature of said mass at a rate of about 5° C./sec to about 60° C./sec.

10. A process according to claim 9 wherein said rate is about 10° C./sec to about 50° C./sec.

11. A process according to claim 1, wherein said mechanical forces include impact forces.

12. A process according to claim 1 wherein said rotor element comprises generally radially extending mixing elements rotatable about an axis.

13. A process according to claim 11 wherein said tip speed is about 25 to about 50 meters/second.

14. A process according to claim 1, wherein said mass is subjected to mechanical working in the absence of a vulcanization inhibitor.

15. A process according to claim 1, wherein said mass is subjected to said mechanical working in the presence of a vulcanization inhibitor.

16. A process for regeneration of rubber to form a vulcanizable rubber mass, said process consisting essentially of the steps of:

providing a mass consisting essentially of vulcanized rubber in finely divided form in an apparatus for applying mechanical forces to rubber comprising a stationary chamber and a single rotor shaft carrying a rotor element having a tip, said element being rotatable in the chamber at a tip speed of at least about 20 meters per second;

subjecting said mass to mechanical working that applies impact forces to said mass by rotating said element at a tip speed of at least about 20 meters per second to dissipate energy in said mass at a rate of not less than about 1000 watts per 100 g of said mass, said mechanical working being sufficient to regenerate said rubber without degrading said rubber, such that a vulcanizable rubber mass is formed exhibiting on curing a tensile strength of at least 35% that of similarly cured virgin rubber compound.

17. A process for regeneration of rubber to form a vulcanizable rubber mass, said process consisting essentially of the steps of:

providing a mass consisting essentially of vulcanized rubber in finely divided form in an apparatus for applying mechanical forces to rubber comprising a stationary chamber and a single rotor shaft carrying a rotor element having a tip, said element being rotatable in the chamber at a tip speed of at least about 20 meters per second;

subjecting said mass to mechanical working that applies impact forces to said mass in said apparatus by rotating said element at a tip speed of at least about 20 meters per second to dissipate energy in said mass at a rate of not less than about 1,000 watts per 100 g of mass, said mechanical working being sufficient to regenerate said rubber without degrading said rubber, such that a vulcanizable rubber mass is formed exhibiting on curing a tensile strength at least 35% that of similarly cured virgin rubber compound.

18. A process according to claim 17, wherein said working dissipates energy in said mass at a rate of from about 1,000 to 145,000 watts per 100 g of the weight of said mass.

19. A process according to claim 18, wherein said rate is about 4,000 to about 35,000 watts per 100 g.

20. A process according to claim 17, wherein said rubber is tire crumb.

21. A process according to claim 20, wherein said tire crumb is passenger tire crumb.

22. A process according to claim 20, wherein said tire crumb is derived from heavy service tires.

23. A process according to claim 17, wherein said rubber has a particle size about 4 to about 200 mesh.

24. A process according to claim 23, wherein said particle size is about 6 to about 60 mesh.

25. A process according to claim 17, wherein said working raises the temperature of said mass at a rate of about 5° C./sec to about 60° C./sec.

26. A process according to claim 25, wherein said rate is about 10° C./sec to about 50° C./sec.

27. A process according to claim 17, wherein said mass is subjected to mechanical working in the absence of a vulcanization inhibitor.

28. A process according to claim 17, wherein said mass is subjected to said mechanical working in the presence of a vulcanization inhibitor.

29. A process according to claim 12, wherein the tip speed is about 20 to 70 meters/second.

* * * * *